(12) United States Patent
Higgins et al.

(10) Patent No.: US 11,444,499 B1
(45) Date of Patent: Sep. 13, 2022

(54) STELLA WINDING

(71) Applicant: GENERAL ATOMICS, San Diego, CA (US)

(72) Inventors: Christopher D. Higgins, Tupelo, MS (US); Herman Schlicht, III, Nettleton, MS (US); James R. Vinson, Shannon, MS (US); Timothy Jones, Tupelo, MS (US); Daniel Stanford, Fulton, MS (US)

(73) Assignee: GENERAL ATOMICS, San Diego, CA (US)

( * ) Notice: Subject to any disclaimer, the term of this patent is extended or adjusted under 35 U.S.C. 154(b) by 518 days.

(21) Appl. No.: 16/655,747

(22) Filed: Oct. 17, 2019

(51) Int. Cl.
 *H02K 1/26* (2006.01)
(52) U.S. Cl.
 CPC ......... *H02K 1/265* (2013.01); *H02K 2203/09* (2013.01); *H02K 2213/03* (2013.01)
(58) Field of Classification Search
 CPC ........................... H02K 1/265; H02K 2213/03
 See application file for complete search history.

(56) References Cited

U.S. PATENT DOCUMENTS

| | | | |
|---|---|---|---|
| 3,878,602 A | 4/1975 | Schubert | |
| 5,682,070 A | 10/1997 | Adachi | |
| 5,874,795 A | 2/1999 | Sakamoto | |
| 6,157,109 A | 12/2000 | Schiferl | |
| 6,859,019 B2 | 2/2005 | Tornquist | |
| 7,135,793 B2 | 11/2006 | Seguchi | |
| 7,652,402 B2 | 1/2010 | Kinoshita | |
| 7,948,127 B2 | 5/2011 | McDowall | |
| 9,231,457 B2 | 1/2016 | Abbasian | |
| 9,608,493 B2 | 3/2017 | Nonoguchi | |
| 2005/0017592 A1 | 1/2005 | Fukushima | |
| 2006/0087293 A1 | 4/2006 | Xu | |
| 2010/0019628 A1 | 1/2010 | Kitzmiller | |
| 2018/0166932 A1 | 6/2018 | Desai | |

FOREIGN PATENT DOCUMENTS

JP 3701639 3/2004

*Primary Examiner* — Ramon M Barrera
(74) *Attorney, Agent, or Firm* — Fitch, Even, Tabin & Flannery LLP

(57) ABSTRACT

A rotor for a rotating electric machine is described. Embodiments of the apparatus may include a rotor core comprising a plurality of slots, the rotor core comprising a circumference, a first winding comprising a first termination end exiting the rotor core at a first of the plurality of slots, a second winding comprising a second termination end exiting the rotor core at a second of the plurality of slots, wherein the second of the plurality of slots is 120 degrees around the circumference of the rotor core relative to the first of the plurality of slots, and a third winding comprising a third termination end exiting the rotor core at a third of the plurality of slots, wherein the third of the plurality of slots is 240 degrees around the circumference of the rotor core relative to the first of the plurality of slots.

13 Claims, 7 Drawing Sheets

STELLA WINDING

BACKGROUND OF THE INVENTION

1. Field of the Invention

The present invention relates generally to electrical machines, and more specifically to generator windings for electrical machines.

2. Discussion of the Related Art

Various systems and processes are known in the art that utilize rotating electric machines. For example, an electric generator converts mechanical energy into electrical energy by moving an electrical conductor in a magnetic field. A generator often includes one or more rotating components known as rotors. In some cases, an exciter rotor is used to generate a power for creating magnetic field for a main rotor.

In some cases, rotating electric machines may operate at high rotational speeds. At high speeds, electrical terminations (including solder, heat sinks, etc.) may cause weight imbalances that impede the smooth operation of the device. This may eventually result in damage to the machine.

SUMMARY

A rotor and method for producing a rotor for a rotating electric machine are described. Embodiments of the apparatus and method may include a rotor core comprising a plurality of slots, the rotor core comprising a circumference, a first winding comprising a first termination end exiting the rotor core at a first of the plurality of slots, a second winding comprising a second termination end exiting the rotor core at a second of the plurality of slots, wherein the second of the plurality of slots is 120 degrees around the circumference of the rotor core relative to the first of the plurality of slots, and a third winding comprising a third termination end exiting the rotor core at a third of the plurality of slots, wherein the third of the plurality of slots is 240 degrees around the circumference of the rotor core relative to the first of the plurality of slots.

A rotor and method for producing a rotor for a rotating electric machine are described. Embodiments of the apparatus and method may include a laminated rotor core, a first winding installed in a first plurality of slots formed in the laminated rotor core, the first winding comprising a first plurality of round shaped conductors, open ends of which are positioned at a radial angle of 0, and opposite ends of which are electrically connected to a floating neutral, a second winding installed in a second plurality of slots formed in the laminated rotor core, the second winding comprising a second plurality of round shaped conductors, open ends of which are positioned at a radial angle of 120, and opposite ends of which are electrically connected to the floating neutral, a third winding installed in slots formed in the laminated rotor core, the third winding comprising a third plurality of round shaped conductors, open ends of which are positioned at a radial angle of 240 degrees, and opposite ends of which are electrically connected to the floating neutral, and the first winding is arranged in a three-phase winding combination comprising a delta-winding connected in delta-connection and a star-winding connected in star-connection.

DETAILED DESCRIPTION

The present disclosure describes a rotating electric machine that provides a more even weight distribution that may improve the operation of the machine at high speeds. Embodiments of the disclosure include a distribution of coil leads (i.e., start and stop points) that provide for ease of manufacturing, as well as improved distribution of weight. The improved weight distribution may enable better balance during high speed operation.

In one embodiment, the starts and stops for each coil winding leads (or lags, depending on rotation) by 120°, giving an equal distribution of weight. For example, a first phase A may start at 0°, followed by a phase B starting at 120°, and a third phase C starting at 240°.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
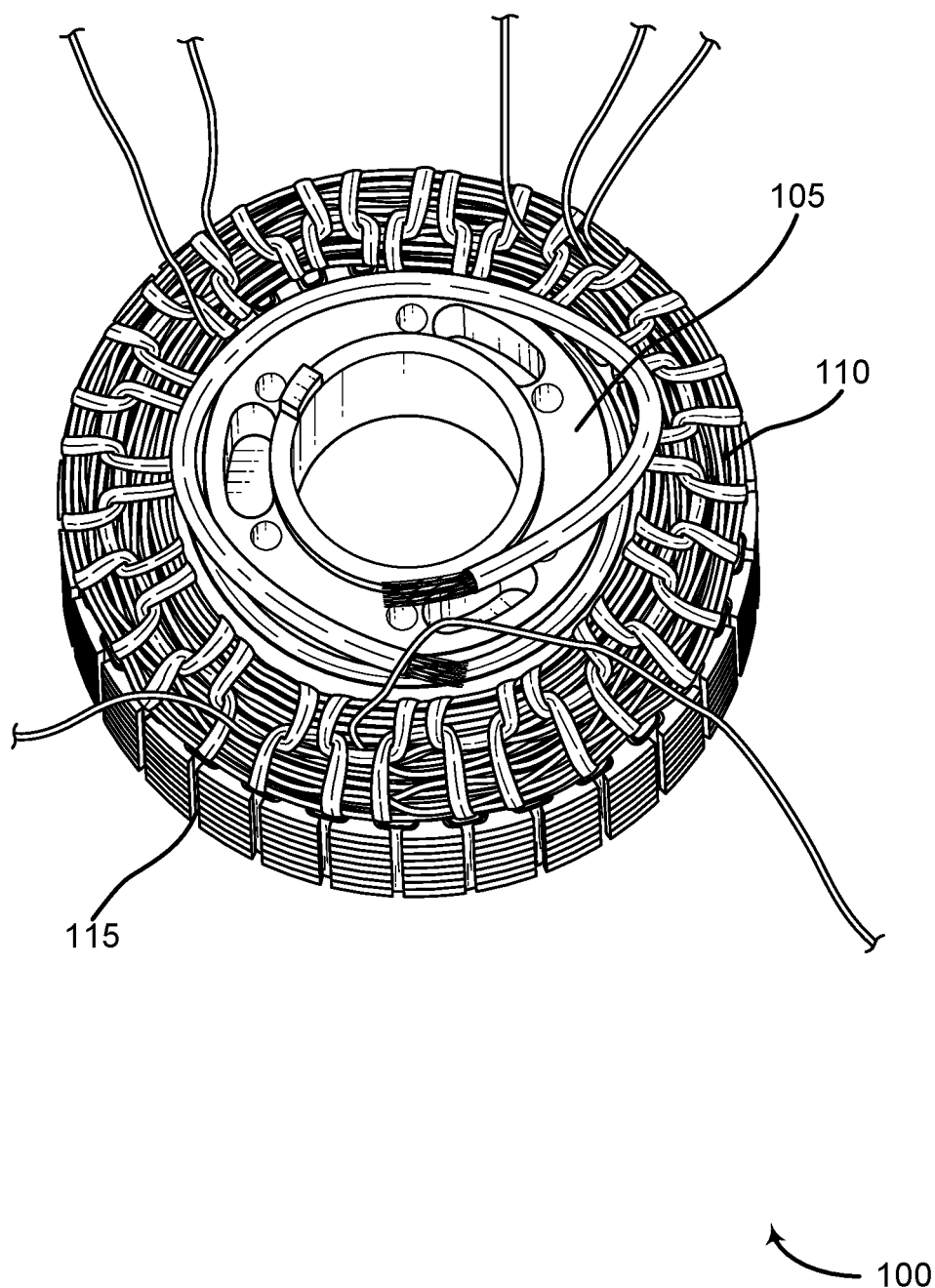
FIG. 1 shows an example of a rotor for a rotating electric machine in accordance with aspects of the present disclosure.

FIG. 1 shows an example of a rotor 100 for a rotating electric machine in accordance with aspects of the present disclosure. Specifically, FIG. 1 shows a rotor winding of a rotating electric machine that provides improved weight distribution and manufacturability. The arrangement may be referred to as a "stella" winding (star-winding).

The rotor winding of a rotating electric machine includes a rotor core 105 and coil windings 110 installed in slots 115 formed in the rotor core winding. The rotor coil windings 110 may be comprised of a number of round shaped conductors. An open end of at least one winding 110 is positioned at a radial angle of 0° (starting), and the end of the rotor coil may be electrically connected to floating neutral.

In some embodiments, the rotor winding 110 is arranged in a "stella" winding which refers to a combination of a delta-winding connected in delta-connection and a star-winding connected in star-connection. The winding 110 may be comprised of three phase windings. Each phase winding 110 includes three, four or more phase winding units.

The ends of the phase windings 110 are led out from the slots 115 and positioned at an axial end of the rotor lamination. A lead wire may be positioned such that each coil laps a coverage of 36°, for total coverage for each coil winding of 360°.

For example, a first phase starting at 0° and ending at 360°, a second phase leads the first phase by 120°, and a third phase leads the first phase by 240°.

Rotor 100 may include rotor core 105, windings 110, and slots 115. Rotor core 105 may include a plurality of slots 115, the rotor core 105 comprising a circumference. Rotor core 105 may be an example of the corresponding element described with reference to FIGS. 2-5.

In some examples, the set of slots 115 includes thirty slots 115. In some examples, the set of slots 115 are located at 12-degree intervals around the circumference. Slots 115 may be an example of the corresponding element described with reference to FIGS. 2-4.

Figure 2:
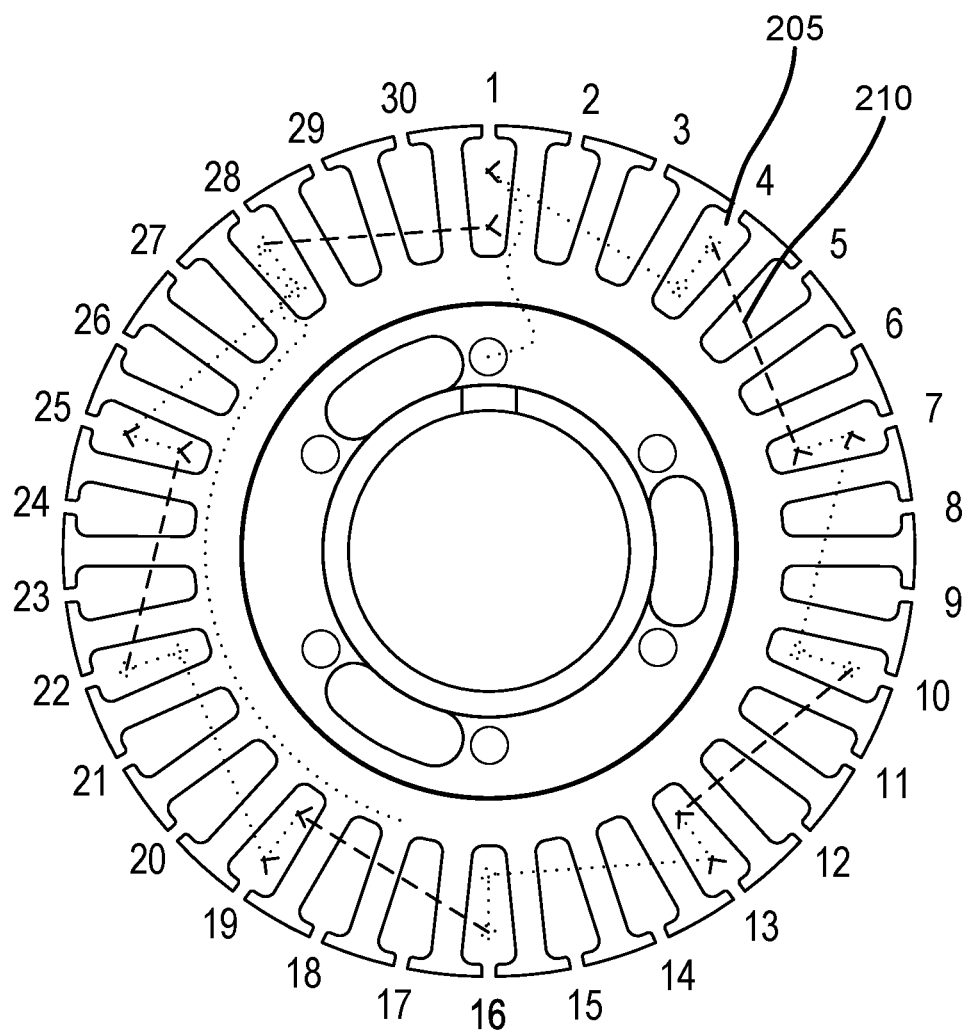
FIG. 2 shows an example of a first winding in accordance with aspects of the present disclosure.

FIG. 2 shows an example of a first winding 210 in accordance with aspects of the present disclosure. The example shown includes rotor core 200, slots 205, and first winding 210.

Rotor core 200 may be an example of the corresponding element described with reference to FIGS. 1, and 3-5. Slots 205 may be an example of the corresponding element described with reference to FIGS. 1, 3, and 4. First winding 210 may be an example of the corresponding element described with reference to FIG. 5.

First winding 210 may include a first termination end exiting the rotor core 200 at a first of the plurality of slots 205. In some examples, the first winding 210 may include a circular cross section. In some examples, the first winding 210 may include a first neutral end. In some examples, the first neutral end, the second neutral end and the third neutral end are electrically coupled to one another in a star-delta. In some examples, the first winding 210 passes through respective ones of the set of slots 205 at 36-degree intervals beginning with the first of the set of slots 205 at 0 degrees, and may include alternating clockwise and counter-clockwise windings.

First winding 210 may be installed in a first plurality of slots 205 formed in the laminated rotor core 200, the first winding 210 comprising a first plurality of round shaped conductors, open ends of which are positioned at a radial angle of 0, and opposite ends of which are electrically connected to a floating neutral. In some examples, the first winding 210 is arranged in a three-phase winding combination which may include a delta-winding connected in delta-connection and a star-winding connected in star-connection.

In some examples, the first winding 210 consists of a first set of ten coils, rotated either clockwise or counterclockwise, and each of the first set of ten coils passes through two slots 205.

First winding 210 may include a first coil that passes through a first slot of the laminated rotor core 200 and a fourth slot of the laminated rotor core 200. First winding 210 may also include a second coil that passes through the fourth slot of the laminated rotor core 200 and a seventh slot of the laminated rotor core 200. First winding 210 may also include a third coil that passes through the seventh slot of the laminated rotor core 200 and a tenth slot of the laminated rotor core 200. First winding 210 may also include a fourth coil that passes through the tenth slot of the laminated rotor core 200 and a thirteenth slot of the laminated rotor core 200.

First winding 210 may also include a fifth coil that passes through the thirteenth slot of the laminated rotor core 200 and a sixteenth slot of the laminated rotor core 200.

First winding 210 may also include a sixth coil that passes through the sixteenth slot of the laminated rotor core 200 and a nineteenth slot of the laminated rotor core 200. First winding 210 may also include a seventh coil that passes through the nineteenth slot of the laminated rotor core 200 and a twenty-second slot of the laminated rotor core 200. First winding 210 may also include an eighth coil that passes through the twenty-second slot of the laminated rotor core 200 and a twenty-fifth slot of the laminated rotor core 200. First winding 210 may also include a ninth coil that passes through the twenty-fifth slot of the laminated rotor core 200 and a twenty-eighth slot of the laminated rotor core 200. First winding 210 may also include a tenth coil that passes through the twenty-eighth slot of the laminated rotor core 200 and the first slot of the laminated rotor core 200. In some examples, the tenth coil of the first winding 210 is coupled to the floating neutral.

Figure 3:
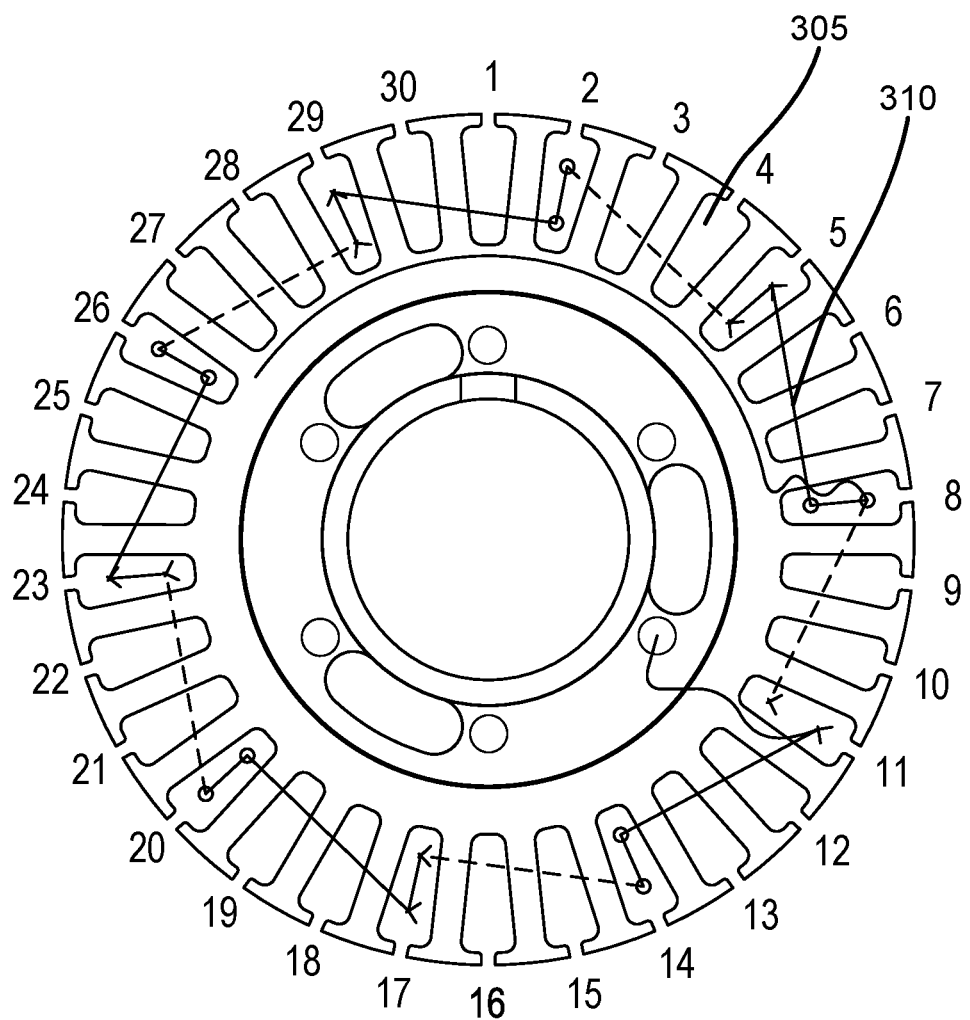
FIG. 3 shows an example of a second winding in accordance with aspects of the present disclosure.

FIG. 3 shows an example of a second winding 310 in accordance with aspects of the present disclosure. The example shown includes rotor core 300, slots 305, and second winding 310.

Rotor core 300 may be an example of the corresponding element described with reference to FIGS. 1, 2, 4, and 5. Slots 305 may be an example of the corresponding element described with reference to FIGS. 1, 2, and 4. Second winding 310 may be an example of the corresponding element described with reference to FIG. 5.

Second winding 310 may include a second termination end exiting the rotor core 300 at a second of the plurality of slots 305, wherein the second of the plurality of slots 305 is 120 degrees around the circumference of the rotor core 300 relative to the first of the plurality of slots 305. In some examples, the rotor core 300 is a laminated rotor core 300. In some examples, the second winding 310 includes a circular cross section.

In some examples, the second winding 310 may include a second neutral end. In some examples, the second winding 310 passes through respective ones of the set of slots 305 at 36-degree intervals beginning with the second of the set of slots 305 at 120 degrees, and may include alternating clockwise and counter-clockwise windings.

Second winding 310 may be installed in a second plurality slots 305 formed in the laminated rotor core 300, the second winding 310 comprising a second plurality of round shaped conductors, open ends of which are positioned at a radial angle of 120, and opposite ends of which are electrically connected to the floating neutral.

In some examples, the second winding 310 consists of a second set of ten coils, rotated either clockwise or counterclockwise, and each of the second set of ten coils passes through two slots 305.

Second winding 310 may also comprise a first coil of the second winding passing through an eleventh slot of the laminated rotor core 300 and a fourteenth slot of the laminated rotor core 300. Second winding 310 may also include a second coil that passes through the fourteenth slot of the laminated rotor core 300 and a seventeenth slot of the laminated rotor core 300. Second winding 310 may also comprise a third coil passing through the seventeenth slot of the laminated rotor core 300 and a twentieth slot of the laminated rotor core 300. Second winding 310 may also include a fourth coil that passes through the twentieth slot of the laminated rotor core 300 and a twenty-third slot of the laminated rotor core 300. Second winding 310 may also include a fifth coil that passes through the twenty-third slot of the laminated rotor core 300 and a twenty-sixth slot of the laminated rotor core 300.

Second winding 310 may also include a sixth coil that passes through the twenty-sixth slot of the laminated rotor core 300 and a twenty-ninth slot of the laminated rotor core 300. Second winding 310 may also include a seventh coil that passes through the twenty-ninth slot of the laminated rotor core 300 and a second slot of the laminated rotor core 300. Second winding 310 may also include an eighth coil that passes through the second slot of the laminated rotor core 300 and a fifth slot of the laminated rotor core 300. Second winding 310 may also include a ninth coil that passes through the fifth slot of the laminated rotor core 300 and an eighth slot of the laminated rotor core 300. Second winding 310 may also include a tenth coil that passes through the eighth slot of the laminated rotor core 300 and the eleventh slot of the laminated rotor core 300. In some examples, the tenth coil of the second winding 310 is coupled to the floating neutral. In some examples, the second winding 310 leads the first winding by 120 degrees.

Figure 4:
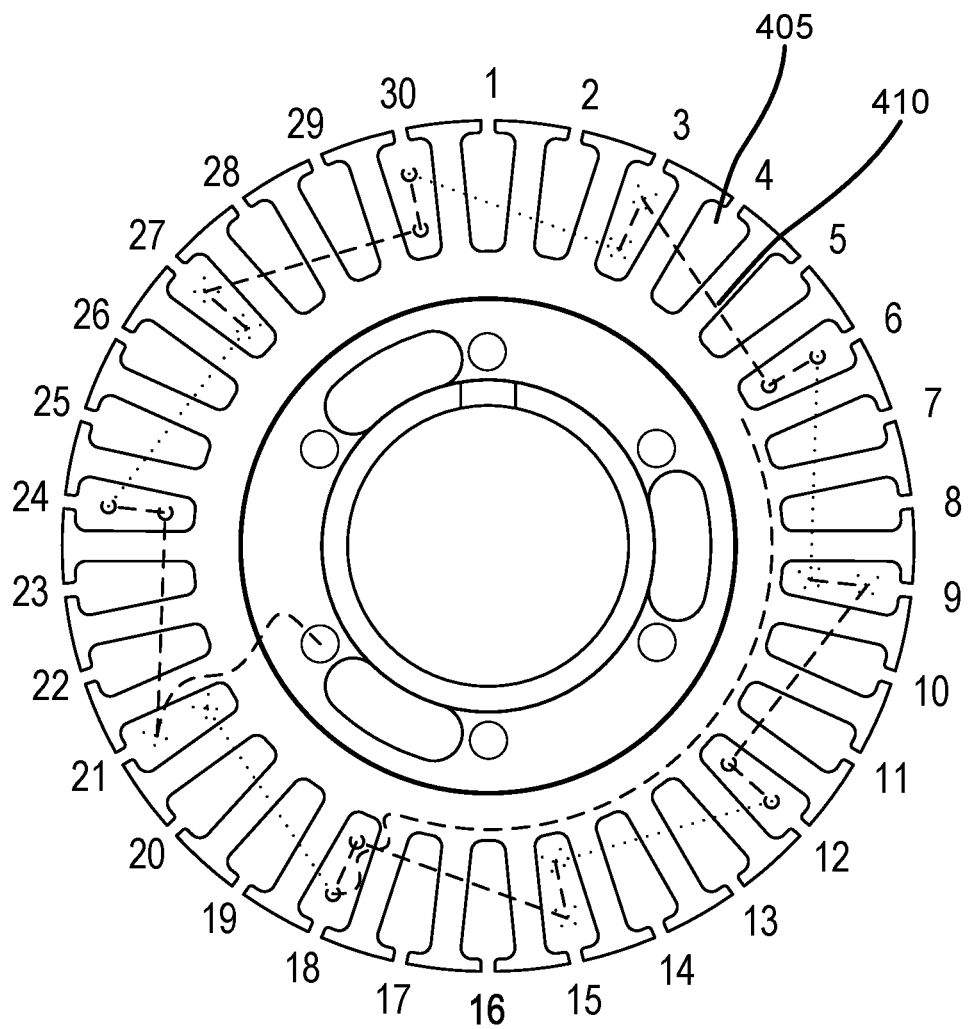
FIG. 4 shows an example of a third winding in accordance with aspects of the present disclosure.

FIG. 4 shows an example of a third winding 410 in accordance with aspects of the present disclosure. The example shown includes rotor core 400, slots 405, and third winding 410.

Rotor core 400 may be an example of the corresponding element described with reference to FIGS. 1-3, and 5. Slots 405 may be an example of the corresponding element described with reference to FIGS. 1-3. Third winding 410 may be an example of the corresponding element described with reference to FIG. 5.

Third winding 410 may include a third termination end exiting the rotor core 400 at a third of the plurality of slots 405, wherein the third of the plurality of slots 405 is 240 degrees around the circumference of the rotor core 400 relative to the first of the plurality of slots 405. In some examples, the third winding 410 includes the circular cross section. In some examples, the third winding 410 may include a third neutral end. In some examples, the first neutral end, the second neutral end and the third neutral end are electrically coupled to one another forming a floating neutral.

In some examples, the third winding 410 passes through respective ones of the set of slots 405 at 36-degree intervals beginning with the third of the set of slots 405 at 240 degrees and may include alternating clockwise and counter-clockwise windings.

Third winding 410 may be installed in slots 405 formed in the laminated rotor core 400, the third winding 410 comprising a third plurality of round shaped conductors, open ends of which are positioned at a radial angle of 240 degrees, and opposite ends of which are electrically connected to the floating neutral.

In some examples, the third winding 410 consists of a third set of ten coils, rotated either clockwise or counterclockwise, each of the third set of ten coils passes through two slots 405.

Third winding 410 may include a first coil that passes through a twenty-first slot of the laminated rotor core 400 and a twenty-fourth slot of the laminated rotor core 400. Third winding 410 may also include a second coil that passes through the twenty-fourth slot of the laminated rotor core 400 and a twenty-seventh slot of the laminated rotor core 400. Third winding 410 may also include a third coil that passes through the twenty-seventh slot of the laminated rotor core 400 and a thirtieth slot of the laminated rotor core 400. Third winding 410 may also include a fourth coil that passes through the thirtieth slot of the laminated rotor core 400 and a third slot of the laminated rotor core 400. Third winding 410 may also include a fifth coil that passes through the third slot of the laminated rotor core 400 and a sixth slot of the laminated rotor core 400.

Third winding 410 may also include a sixth coil that passes through the sixth slot of the laminated rotor core 400 and a ninth slot of the laminated rotor core 400. Third winding 410 may also include a seventh coil that passes through the ninth slot of the laminated rotor core 400 and a twelfth slot of the laminated rotor core 400. Third winding 410 may also include an eighth coil that passes through the twelfth slot of the laminated rotor core 400 and a fifteenth slot of the laminated rotor core 400. Third winding 410 may also include a ninth coil that passes through the fifteenth slot of the laminated rotor core 400 and an eighteenth slot of the laminated rotor core 400. Third winding 410 may also include a tenth coil that passes through the eighteenth slot of the laminated rotor core 400 and the twenty-first slot of the laminated rotor core 400. In some examples, the tenth coil of the third winding 410 is coupled to the floating neutral. In some examples, the third winding 410 leads the second winding by 120 degrees.

In some examples, the first winding leads the third winding 410 by 120 degrees, where each of the first winding, the second winding, and the third winding 410 covers a full 360 degrees of the laminated rotor core 400, whereby the third winding 410 leads the first winding by 240 degrees.

Figure 5:
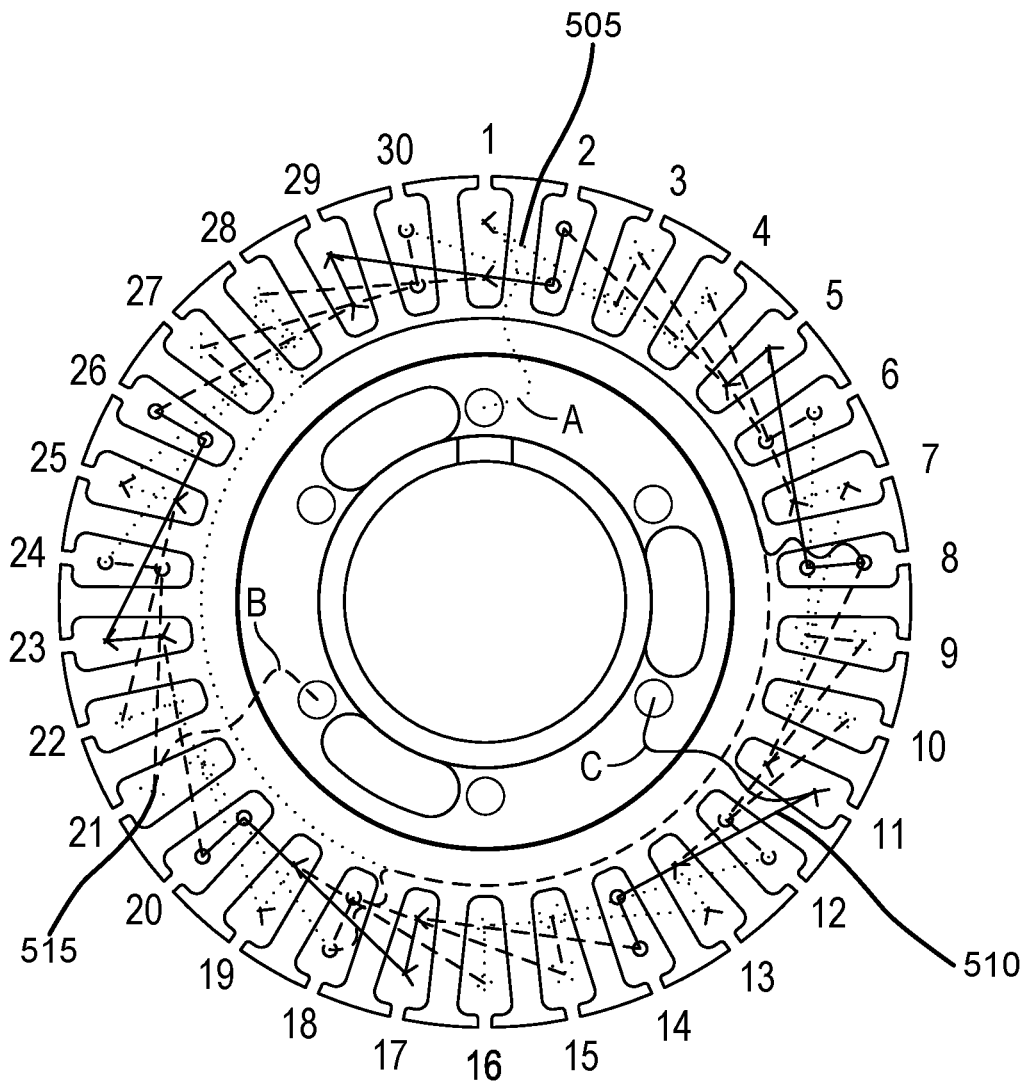
FIG. 5 shows an example of a rotor with three windings in accordance with aspects of the present disclosure.

FIG. 5 shows an example of a rotor with three windings in accordance with aspects of the present disclosure. The example shown includes rotor core 500, first winding 505, second winding 510, and third winding 515.

As illustrated in FIG. 5, first winding 505, second winding 510, and third winding 515 may each be wound through slots of the rotor core, offset from each other by approximately 120 degrees, as described above with reference to FIGS. 2, 3, and 4, respectively. Thus, a winding may be produced with improved weight balance and manufacturability.

Rotor core 500 may be an example of the corresponding element described with reference to FIGS. 1-4. First winding 505 may be an example of the corresponding element described with reference to FIG. 2. Second winding 510 may be an example of the corresponding element described with reference to FIG. 3. Third winding 515 may be an example of the corresponding element described with reference to FIG. 4.

Figure 6:
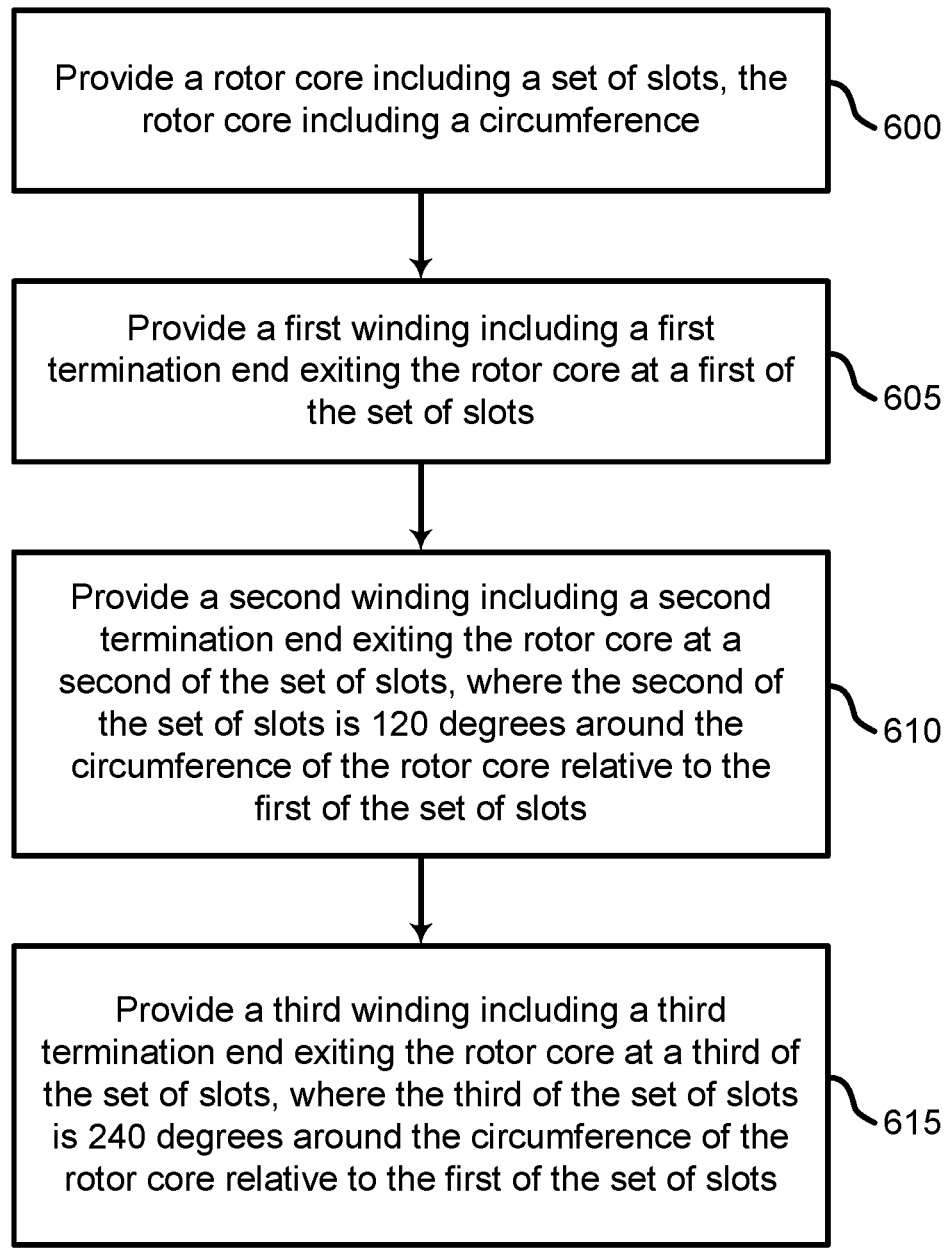
FIGS. 6 and 7 show examples of a process for producing a rotor for a rotating electric machine in accordance with aspects of the present disclosure.

FIG. 6 shows an example of a process for manufacturing a rotor for a rotating electric machine in accordance with aspects of the present disclosure.

At operation 600, the system provides a rotor core may include a set of slots, the rotor core may include a circumference.

At operation 605, the system provides a first winding may include a first termination end exiting the rotor core at a first of the set of slots.

At operation 610, the system provides a second winding including a second termination end exiting the rotor core at a second of the set of slots, where the second of the set of slots is 120 degrees around the circumference of the rotor core relative to the first of the set of slots.

At operation 615, the system provides a third winding including a third termination end exiting the rotor core at a third of the set of slots, where the third of the set of slots is 240 degrees around the circumference of the rotor core relative to the first of the set of slots.

Figure 7:
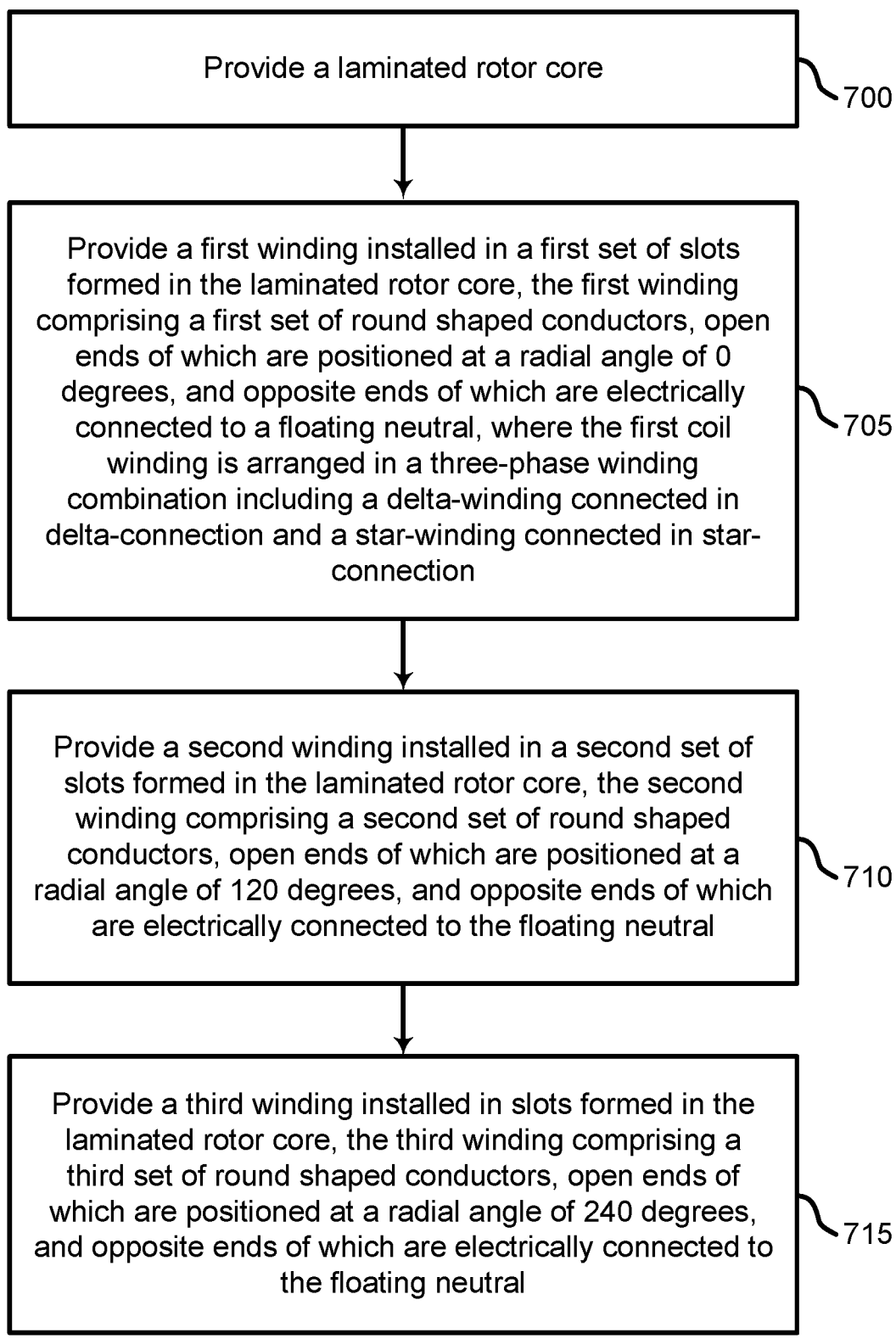

FIG. 7 shows an example of a process for manufacturing a rotor for a rotating electric machine in accordance with aspects of the present disclosure.

At operation 700, the system provides a laminated rotor core.

At operation 705, the system provides a first winding installed in a first set of slots formed in the laminated rotor core, the first winding comprising a first set of round shaped conductors, open ends of which are positioned at a radial angle of 0, and opposite ends of which are electrically connected to a floating neutral, where the first coil winding is arranged in a three-phase winding combination including a delta-winding connected in delta-connection and a star-winding connected in star-connection.

In some embodiments, the first winding is arranged in a three-phase winding combination including a delta-winding connected in delta-connection and a star-winding connected in star-connection.

At operation 710, the system provides a second winding installed in a second set of slots formed in the laminated rotor core, the second winding comprising a second set of round shaped conductors, open ends of which are positioned at a radial angle of 120 degrees, and opposite ends of which are electrically connected to the floating neutral.

At operation 715, the system provides a third winding installed in slots formed in the laminated rotor core, the third winding comprising a third set of round shaped conductors, open ends of which are positioned at a radial angle of 240 degrees, and opposite ends of which are electrically connected to the floating neutral.

Accordingly, the present disclosure includes the following embodiments.

An apparatus for a rotating electric machine is described. Embodiments of the apparatus may include a rotor core comprising a plurality of slots, the rotor core comprising a circumference, a first winding comprising a first termination end exiting the rotor core at a first of the plurality of slots, a second winding comprising a second termination end exiting the rotor core at a second of the plurality of slots, wherein the second of the plurality of slots is 120 degrees around the circumference of the rotor core relative to the first of the plurality of slots, and a third winding comprising a third termination end exiting the rotor core at a third of the plurality of slots, wherein the third of the plurality of slots is 240 degrees around the circumference of the rotor core relative to the first of the plurality of slots.

A method of manufacturing a rotating electric machine is described. The method may include providing a rotor core comprising a plurality of slots, the rotor core comprising a circumference, providing a first winding comprising a first termination end exiting the rotor core at a first of the plurality of slots, providing a second winding comprising a second termination end exiting the rotor core at a second of the plurality of slots, wherein the second of the plurality of slots is 120 degrees around the circumference of the rotor core relative to the first of the plurality of slots, and providing a third winding comprising a third termination end exiting the rotor core at a third of the plurality of slots, wherein the third of the plurality of slots is 240 degrees around the circumference of the rotor core relative to the first of the plurality of slots.

In some examples, the rotor core is a laminated rotor core. In some examples, the first winding comprises a circular cross section. In some examples, the second winding comprises the circular cross section. In some examples, the third winding comprises the circular cross section.

In some examples, the first winding comprises a first neutral end. In some examples, the second winding comprising a second neutral end. In some examples, the third winding comprising a third neutral end.

In some examples, the first neutral end, said second neutral end and said third neutral end are electrically coupled to one another in a star-delta. In some examples, the first neutral end, said second neutral end and said third neutral end are electrically coupled to one another forming a floating neutral.

In some examples, the plurality of slots comprises thirty slots. In some examples, the plurality of slots are at 12-degree intervals around said circumference.

In some examples, the first winding passes through respective ones of the plurality of slots at 36-degree intervals beginning with the first of the plurality of slots at 0 degrees, and comprising alternating clockwise and counter-clockwise windings. In some examples, the second winding passes through respective ones of the plurality of slots at 36-degree intervals beginning with the second of the plurality of slots at 120 degrees, and comprising alternating clockwise and counter-clockwise windings. In some examples, the third winding passes through respective ones of the plurality of slots at 36-degree intervals beginning with the third of the plurality of slots at 240 degrees and comprising alternating clockwise and counter-clockwise windings.

An apparatus for a rotating electric machine is described. Embodiments of the apparatus may include a laminated rotor core, a first winding installed in a first plurality of slots formed in the laminated rotor core, the first winding comprising a first plurality of round shaped conductors, open ends of which are positioned at a radial angle of 0, and opposite ends of which are electrically connected to a floating neutral, a second winding installed in a second plurality of slots formed in the laminated rotor core, the second winding comprising a second plurality of round shaped conductors, open ends of which are positioned at a radial angle of 120, and opposite ends of which are electrically connected to the floating neutral, a third winding installed in slots formed in the laminated rotor core, the third winding comprising a third plurality of round shaped conductors, open ends of which are positioned at a radial angle of 240, and opposite ends of which are electrically connected to the floating neutral, and the first winding is arranged in a three-phase winding combination comprising a delta-winding connected in delta-connection and a star-winding connected in star-connection.

A method of manufacturing a rotating electric machine is described. The method may include providing a laminated rotor core, providing a first winding installed in a first plurality of slots formed in the laminated rotor core, the first winding comprising a first plurality of round shaped conductors, open ends of which are positioned at a radial angle of 0, and opposite ends of which are electrically connected to a floating neutral, providing a second winding installed in a second plurality of slots formed in the laminated rotor core, the second winding comprising a second plurality of round shaped conductors, open ends of which are positioned at a radial angle of 120 degrees, and opposite ends of which are electrically connected to the floating neutral, providing a third winding installed in slots formed in the laminated rotor core, the third winding comprising a third plurality of round shaped conductors, open ends of which are positioned at a radial angle of 240 degrees, and opposite ends of which are electrically connected to the floating neutral, and the first winding is arranged in a three-phase winding combination comprising a delta-winding connected in delta-connection and a star-winding connected in star-connection.

In some examples, the first winding consists of a first set of ten coils, rotated either clockwise or counterclockwise, each of the first set of ten coils passes through two slots. Some examples may further include a first coil of the first winding passing through a first slot of the laminated rotor core and a fourth slot of the laminated rotor core. Some examples may further include a second coil of the first winding passing through the fourth slot of the laminated rotor core and a seventh slot of the laminated rotor core. Some examples may further include a third coil of the first winding passing through the seventh slot of the laminated rotor core and a tenth slot of the laminated rotor core. Some examples may further include a fourth coil of the first winding passing through the tenth slot of the laminated rotor core and a thirteenth slot of the laminated rotor core. Some examples may further include a fifth coil of the first winding passing through the thirteenth slot of the laminated rotor core and a sixteenth slot of the laminated rotor core. Some examples may further include a sixth coil of the first winding passing through the sixteenth slot of the laminated rotor core and a nineteenth slot of the laminated rotor core. Some examples may further include a seventh coil of the first winding passing through the nineteenth slot of the laminated rotor core and a twenty-second slot of the laminated rotor core. Some examples may further include an eighth coil of the first winding passing through the twenty-second slot of the laminated rotor core and a twenty-fifth slot of the laminated rotor core. Some examples may further include a ninth coil of the first winding passing through the twenty-fifth slot of the laminated rotor core and a twenty-eighth slot of the laminated rotor core. Some examples may further include a tenth coil of the first winding passing through the twenty-eighth slot of the laminated rotor core and the first slot of the laminated rotor core.

In some examples, the second winding consists of a second set of ten coils, rotated either clockwise or counterclockwise, each of the second set of ten coils passes through two slots. Some examples may further include a first coil of the second winding passing through an eleventh slot of the laminated rotor core and a fourteenth slot of the laminated rotor core. Some examples may further include a second coil of the second winding passing through the fourteenth slot of the laminated rotor core and a seventeenth slot of the laminated rotor core. Some examples may further include a third coil of the second winding passing through the seventeenth slot of the laminated rotor core and a twentieth slot of the laminated rotor core. Some examples may further include a fourth coil of the second winding passing through the twentieth slot of the laminated rotor core and a twenty-third slot of the laminated rotor core. Some examples may further include a fifth coil of the second winding passing through the twenty-third slot of the laminated rotor core and a twenty-sixth slot of the laminated rotor core. Some examples may further include a sixth coil of the second winding passing through the twenty-sixth slot of the laminated rotor core and a twenty-ninth slot of the laminated rotor core. Some examples may further include a seventh coil of the second winding passing through the twenty-ninth slot of the laminated rotor core and a second slot of the laminated rotor core. Some examples may further include an eighth coil of the second winding passing through the second slot of the laminated rotor core and a fifth slot of the laminated rotor core. Some examples may further include a ninth coil of the second winding passing through the fifth slot of the laminated rotor core and an eighth slot of the laminated rotor core. Some examples may further include a tenth coil of the second winding passing through the eighth slot of the laminated rotor core and the eleventh slot of the laminated rotor core.

In some examples, the third winding consists of a third set of ten coils, rotated either clockwise or counterclockwise, each of the third set of ten coils passes through two slots. Some examples may further include a first coil of the third winding passing through a twenty-first slot of the laminated rotor core and a twenty-fourth slot of the laminated rotor core. Some examples may further include a second coil of the third winding passing through the twenty-fourth slot of the laminated rotor core and a twenty-seventh slot of the laminated rotor core. Some examples may further include a third coil of the third winding passing through the twenty-seventh slot of the laminated rotor core and a thirtieth slot of the laminated rotor core. Some examples may further include a fourth coil of the third winding passing through the thirtieth slot of the laminated rotor core and a third slot of the laminated rotor core. Some examples may further include a fifth coil of the third winding passing through the third slot of the laminated rotor core and a sixth slot of the laminated rotor core. Some examples may further include a sixth coil of the third winding passing through the sixth slot of the laminated rotor core and a ninth slot of the laminated rotor core. Some examples may further include a seventh coil of the third winding passing through the ninth slot of the laminated rotor core and a twelfth slot of the laminated rotor core. Some examples may further include an eighth coil of the third winding passing through the twelfth slot of the laminated rotor core and a fifteenth slot of the laminated rotor core. Some examples may further include a ninth coil of the third winding passing through the fifteenth slot of the laminated rotor core and an eighteenth slot of the laminated rotor core. Some examples may further include a tenth coil of the third winding passing through the eighteenth slot of the laminated rotor core and the twenty-first slot of the laminated rotor core.

In some examples, the tenth coil of the first winding is coupled to the floating neutral. In some examples, the tenth coil of the second winding is coupled to the floating neutral. In some examples, the tenth coil of the third winding is coupled to the floating neutral.

In some examples, the second winding leads the first winding by 120 degrees. In some examples, the third winding leads the second winding by 120 degrees. In some examples, the first winding leads the third winding by 120 degrees, wherein each of the first winding, the second winding, and the third winding covers a full 360 degrees of the laminated rotor core, whereby the third winding leads the first winding by 240 degrees.

While the invention herein disclosed has been described by means of specific embodiments, examples and applications thereof, numerous modifications and variations could be made thereto by those skilled in the art without departing from the scope of the invention set forth in the claims.

What is claimed is:

1. A rotor for a rotating electric machine comprising:
   a rotor core comprising a plurality of slots, the rotor core comprising a circumference;
   a first winding comprising a first termination end exiting the rotor core at a first of the plurality of slots;
   a second winding comprising a second termination end exiting the rotor core at a second of the plurality of slots, wherein the second of the plurality of slots is 120 degrees around the circumference of the rotor core relative to the first of the plurality of slots; and a third winding comprising a third termination end exiting the rotor core at a third of the plurality of slots, wherein the third of the plurality of slots is 240 degrees around the circumference of the rotor core relative to the first of the plurality of slots.

2. The rotor of claim 1 comprising:
said rotor core, wherein said rotor core is a laminated rotor core.

3. The rotor of claim 1 comprising:
said first winding, wherein said first winding comprising a circular cross section;
said second winding, wherein said second winding comprises the circular cross section;
said third winding, wherein said third winding comprises the circular cross section.

4. The rotor of claim 1 comprising:
said first winding comprising a first neutral end;
said second winding comprising a second neutral end; and
said third winding comprising a third neutral end.

5. The rotor of claim 4 comprising:
said first neutral end;
said second neutral end; and
said third neutral end, wherein said first neutral end, said second neutral end and said third neutral end are electrically coupled to one another in a star-delta.

6. The rotor of claim 4 comprising:
said first neutral end;
said second neutral end; and
said third neutral end, wherein said first neutral end, said second neutral end and said third neutral end are electrically coupled to one another forming a floating neutral.

7. The rotor of claim 4 comprising:
said plurality of slots comprises thirty slots.

8. The rotor of claim 7 comprising:
said plurality of slots at 12-degree intervals around said circumference.

9. The rotor of claim 8 comprising:
said first winding passes through respective ones of the plurality of slots at 36-degree intervals beginning with the first of the plurality of slots at 0 degrees, and comprising alternating clockwise and counter-clockwise windings;
said second winding passes through respective ones of the plurality of slots at 36-degree intervals beginning with the second of the plurality of slots at 120 degrees, and comprising alternating clockwise and counter-clockwise windings; and
said third winding passes through respective ones of the plurality of slots at 36-degree intervals beginning with the third of the plurality of slots at 240 degrees and comprising alternating clockwise and counter-clockwise windings.

10. A rotor winding of a rotating electric machine comprising:
a laminated rotor core;
a first winding installed in a first plurality of slots formed in the laminated rotor core, the first winding comprising a first plurality of round shaped conductors, open ends of which are positioned at a radial angle of 0 degrees, and opposite ends of which are electrically connected to a floating neutral;
a second winding installed in a second plurality of slots formed in the laminated rotor core, the second winding comprising a second plurality of round shaped conductors, open ends of which are positioned at a radial angle of 120 degrees, and opposite ends of which are electrically connected to the floating neutral;
a third winding installed in slots formed in the laminated rotor core, the third winding comprising a third plurality of round shaped conductors, open ends of which are positioned at a radial angle of 240 degrees, and opposite ends of which are electrically connected to the floating neutral;
wherein the first winding is arranged in a three-phase winding combination comprising a delta-winding connected in delta-connection and a star-winding connected in star-connection.

11. The rotor winding of claim 10, wherein:
said first winding consists of a first set of ten coils, rotated either clockwise or counterclockwise, each of the first set of ten coils passes through two slots,
a first coil of the first winding passing through a first slot of the laminated rotor core and a fourth slot of the laminated rotor core,
a second coil of the first winding passing through the fourth slot of the laminated rotor core and a seventh slot of the laminated rotor core,
a third coil of the first winding passing through the seventh slot of the laminated rotor core and a tenth slot of the laminated rotor core,
a fourth coil of the first winding passing through the tenth slot of the laminated rotor core and a thirteenth slot of the laminated rotor core,
a fifth coil of the first winding passing through the thirteenth slot of the laminated rotor core and a sixteenth slot of the laminated rotor core,
a sixth coil of the first winding passing through the sixteenth slot of the laminated rotor core and a nineteenth slot of the laminated rotor core,
a seventh coil of the first winding passing through the nineteenth slot of the laminated rotor core and a twenty-second slot of the laminated rotor core,
an eighth coil of the first winding passing through the twenty-second slot of the laminated rotor core and a twenty-fifth slot of the laminated rotor core,
a ninth coil of the first winding passing through the twenty-fifth slot of the laminated rotor core and a twenty-eighth slot of the laminated rotor core,
a tenth coil of the first winding passing through the twenty-eighth slot of the laminated rotor core and the first slot of the laminated rotor core;
said second winding consists of a second set of ten coils, rotated either clockwise or counterclockwise, each of the second set of ten coils passes through two slots,
a first coil of the second winding passing through an eleventh slot of the laminated rotor core and a fourteenth slot of the laminated rotor core,
a second coil of the second winding passing through the fourteenth slot of the laminated rotor core and a seventeenth slot of the laminated rotor core,
a third coil of the second winding passing through the seventeenth slot of the laminated rotor core and a twentieth slot of the laminated rotor core,
a fourth coil of the second winding passing through the twentieth slot of the laminated rotor core and a twenty-third slot of the laminated rotor core,
a fifth coil of the second winding passing through the twenty-third slot of the laminated rotor core and a twenty-sixth slot of the laminated rotor core,
a sixth coil of the second winding passing through the twenty-sixth slot of the laminated rotor core and a twenty-ninth slot of the laminated rotor core, a seventh coil of the second winding passing through the twenty-ninth slot of the laminated rotor core and a second slot of the laminated rotor core, an eighth coil of the second winding passing through the second slot of the laminated rotor core and a fifth slot of the laminated rotor core, a ninth coil of the second winding passing through the fifth slot of the laminated rotor core and an eighth slot of the laminated rotor core, a tenth coil of the second winding passing through the eighth slot of the laminated rotor core and the eleventh slot of the laminated rotor core;

said third winding consists of a third set of ten coils, rotated either clockwise or counterclockwise, each of the third set of ten coils passes through two slots, a first coil of the third winding passing through a twenty-first slot of the laminated rotor core and a twenty-fourth slot of the laminated rotor core, a second coil of the third winding passing through the twenty-fourth slot of the laminated rotor core and a twenty-seventh slot of the laminated rotor core, a third coil of the third winding passing through the twenty-seventh slot of the laminated rotor core and a thirtieth slot of the laminated rotor core, a fourth coil of the third winding passing through the thirtieth slot of the laminated rotor core and a third slot of the laminated rotor core, a fifth coil of the third winding passing through the third slot of the laminated rotor core and a sixth slot of the laminated rotor core, a sixth coil of the third winding passing through the sixth slot of the laminated rotor core and a ninth slot of the laminated rotor core, a seventh coil of the third winding passing through the ninth slot of the laminated rotor core and a twelfth slot of the laminated rotor core, an eighth coil of the third winding passing through the twelfth slot of the laminated rotor core and a fifteenth slot of the laminated rotor core, a ninth coil of the third winding passing through the fifteenth slot of the laminated rotor core and an eighteenth slot of the laminated rotor core, a tenth coil of the third winding passing through the eighteenth slot of the laminated rotor core and the twenty-first slot of the laminated rotor core.

12. The rotor winding of claim 11, wherein:

the tenth coil of the first winding is coupled to the floating neutral;

the tenth coil of the second winding is coupled to the floating neutral; and the tenth coil of the third winding is coupled to the floating neutral.

13. The rotor winding of claim 11, wherein:

the second winding leads the first winding by 120 degrees, the third winding leads the second winding by 120 degrees, and the first winding leads the third winding by 120 degrees, wherein each of the first winding, the second winding, and the third winding covers a full 360 degrees of the laminated rotor core, whereby the third winding leads the first winding by 240 degrees.

* * * * *